July 14, 1964 W. A. YOUNG 3,140,901
SHAFT SUPPORT

Filed Nov. 27, 1962 2 Sheets-Sheet 1

INVENTOR.
WILLIAM A. YOUNG
BY
*Price & Heneveld*
ATTORNEYS

July 14, 1964

W. A. YOUNG 3,140,901

SHAFT SUPPORT

Filed Nov. 27, 1962

INVENTOR.
WILLIAM A. YOUNG

BY

ATTORNEYS

United States Patent Office 3,140,901
Patented July 14, 1964

3,140,901
SHAFT SUPPORT
William A. Young, 2933 Leahy St.,
Muskegon Heights, Mich.
Filed Nov. 27, 1962, Ser. No. 240,360
8 Claims. (Cl. 308—26)

This invention relates to a shaft support, and particularly to a vehicle drive shaft support collar.

The drive or propeller shaft of a vehicle conventionally includes three universal joints. Between the first and second universal joints is a support collar which conventionally comprises a continuous, one piece annulus having the ends radially deformed outwardly and flattened to provide a lower base. This base is attached uprightly on a vehicle frame by cap screws which protrude up through a frame portion and are threadably engaged with tapped sockets in the support base. The support is housed inside an opening or tunnel through the center of the frame. Since automobile manufacturers wish to reduce the size of this tunnel as much as possible, they provide only very slight clearance between this collar support and the inner wall of the surrounding tunnel. Thus, the outer metal annular shell or collar of the shaft support, which houses an annular rubber cushion and bearing, is presently purposely formed of one continuous piece of metal to assume minimum space.

The inventor herein, an automobile mechanic, has found that when the rubber cushion becomes brittle and deformed due to its age, and sag is created by the weight of the drive shaft on the cushion, the task of repairing the assembly is extremely difficult and expensive. In fact, to replace it properly is impossible. For example, to attempt to insert a new annular rubber cushion, the cushion must be compressed to fit inside annular concave metal collar portions, and must be simultaneously expanded or stretched to cause its internal concave portion to fit over the bearing, while also sliding it axially. Alternatively, it must first be stretched over the bearing and then compressed on the bearing while inserting it into the collar. Needless to say, either approach is extremely difficult, and often impossible.

Moreover, disconnection of the collar from the frame to repair it often results in twisting off of the rusted cap screws inside the tapped collar base holes, since the cap screws are exposed under the automobile where they quickly rust. Then to reuse the old collar, the rusted in screw portions must be drilled out and the holes retapped, or equivalent steps taken. Ordinarily, the old collar or shell must be re-used since, to remove it from the drive shaft requires a major disassembly of the universal joint from the shaft. In brief, the entire repair cannot really be properly accomplished, and necessitates makeshift methods with their subsequent unreliability. Moreover, it is not possible to replace the one piece collar with known types of split collars since these are connected by pairs of radially, outwardly projecting ears which will not fit within the small tunnel clearance.

The inventor herein, unsatisfied with such difficult, expensive, and makeshift techniques has invented a unique replaceable shaft support collar.

It is the principal object of this invention to provide a vehicle drive shaft support shell that any repairman can readily remove and replace from the drive shaft, or substitute for the manufacturer's original equipment support, simply by the removal of a couple of bolts. It can be removed from the drive shaft with no need to remove the universal joint components from the shaft. It allows a simple, inexpensive replacement of a worn rubber cushion without a major repair expense. If rusty cap screws are twisted off in the old collar, a new collar part is easily substituted. A new rubber shaft cushion can be readily fitted over the bearing first, and then the new collar slipped over the rubber cushion in a matter of a minute or so. Moreover, the split collar fits neatly inside the closely spaced tunnel, and assumes no more space than the conventional one piece shell of the original manufacturer.

It is another object of this invention to provide a drive shaft bearing support that not only is removable and replaceable using a unique connecting means between the two half shells, but which also provides improved shaft support on the rubber cushion, to thus cause less cushion sag over a period of time. Instead of allowing the shaft to press the cushion down into the cleft where the two ends of the shell are radially deformed to form the base, a unique saddle support is provided to largely or completely eliminate cushion sag.

These and other objects of this invention will be apparent upon studying the following specification in conjunction with the drawings, in which.

Figure 1:
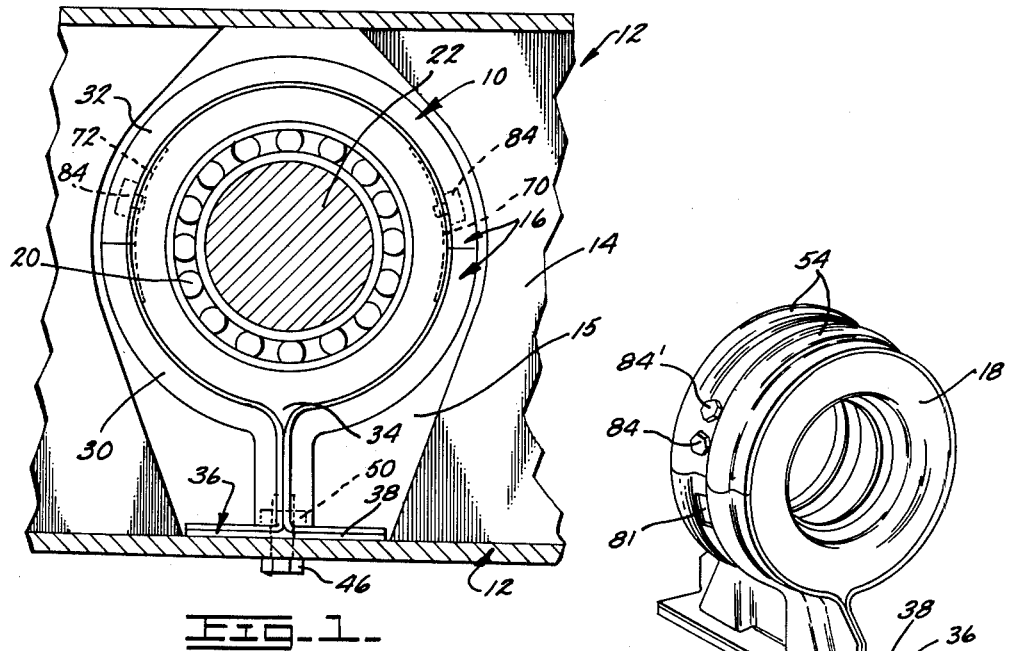
FIG. 1 is an elevational view of the novel shaft and support assembly inside the centrally located automobile frame tunnel and mounted to the bottom of the frame.

Basically, the invention comprises a shaft support, especially for a vehicle drive shaft, having a rigid annular support shell formed of two semi-circular portions, one having a mounting base means, a resilient annular cushion inside the shell and adapted to support a shaft bearing, connecting means between the shell portions comprising a pair of inner arcuate ears projecting circumferentially from one of the shells on opposite sides and having a curvature substantially the same as the other shell portion to fit closely thereagainst, and releasable fasteners between said ears and said other shell portion to allow separation and re-connection of the half shells as necessary.

Preferably, the ears are integral with a strap portion which serves as a saddle for the cushion over the cleft between the radially outwardly projecting ends forming the mounting base, to largely reduce or even eliminate sag of the cushion under the weight of the shaft. This saddle means is preferably slightly elevated, i.e. radially inwardly, with respect to the remainder of the strap.

Referring now specifically to the drawings, the bearing support 10 is mounted to the vehicle frame 12. The frame may, for example, be an X frame with the legs of the X connected at the center, and including a tunnel or conventional elongated opening 15 in the cross panels 14. This tunnel receives the support assembly 10. Support 10 is formed of an outer shell 16, a rubber annular cushion 18, and a conventional bearing 20 supporting drive shaft 22. Since shaft 22 is rotatable inside bearing 20, and is connected to a series of universal joints (not shown), the resilient rubber cushion eliminates noise while allowing some lateral and vertical play for the assembly.

The novel bearing support shell 16 is formed of two semicircular half shells, i.e. bottom half shell 30 and top half shell 32. The bottom half shell 30 is formed of two matching portions which meet to form a cleft at 34 where they are deformed radially outwardly and then flattened to form a support base 36. The terminal ends of the radially outwardly projecting portions are deformed away from each other, and are preferably secured as by weldment to a reinforcing plate 38. The base 36 is secured to the frame portion 12 by cap screws 46 which project upwardly through holes in the frame 12, and into tapped orifices 48 in base 36. These tapped orifices may be formed by the insertion of sleeves 50 secured inside each of the drilled holes in the base.

Figure 4:
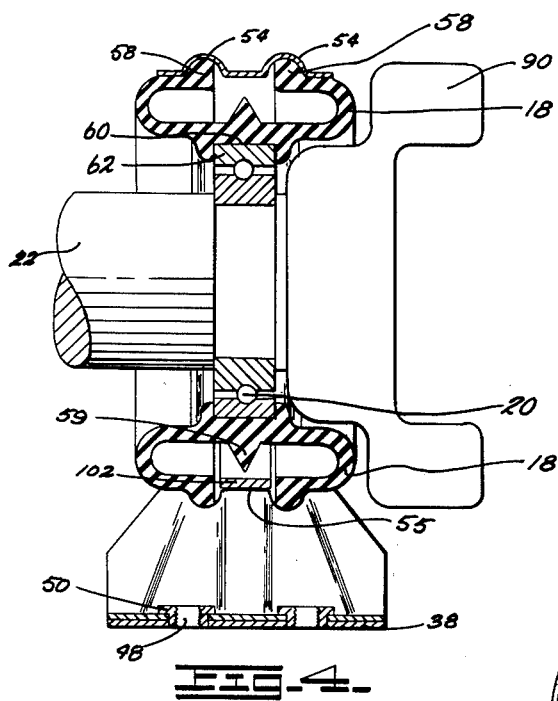
FIG. 4 is a sectional view taken on plane IV—IV of FIG. 1.

The periphery of shell 16 is provided with a pair of outwardly projecting annular ridges 54 which form inner concave annular pockets to receive a pair of corresponding, outwardly-projecting, peripheral ridges 58 on rubber cushion 18 (FIG. 4).

The inner peripheral surface of the rubber cushion includes an annular pocket 60 to receive the outer race 62 of bearing 20. It will be seen that the rubber cushion or grommet would conventionally have to be compressed to interfit inside the collar when the collar is not separable. It must be expanded to fit over bearing 20. Thus, in the conventional one piece collar structure, it is practically impossible to push the rubber cushion along the shaft, stretch it to fit it over the bearing, and compress it to fit it inside the collar.

Figure 2:
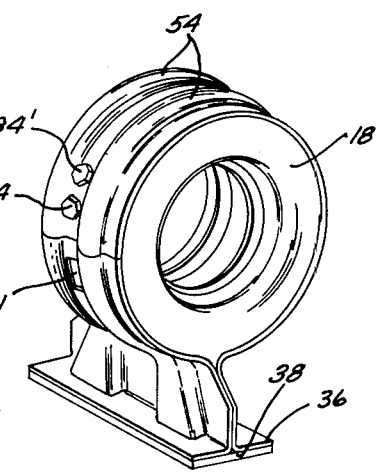
FIG. 2 is a perspective view of the support shell and rubber cushion interfitted therewith.
Figure 3:
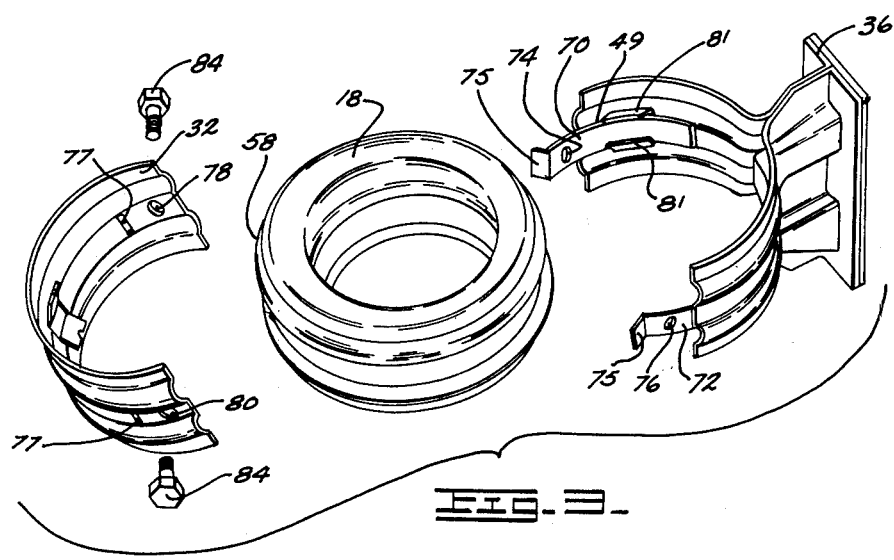
FIG. 3 is an exploded view of the assembly in FIG. 2.

In this invention, the two half shells 30 and 32 are uniquely and rigidly interfitted without assuming any more space than the conventional one piece shell. The connection means between the half shells comprises a pair of arcuate ears 70 and 72 which have their lower ends secured to the lower half shell on the inner diameter thereof between ridges 54. They are preferably secured to the lower half shell by weldment 49 (FIG. 3). Alternatively, they can be attached by bolts, or may even be integral with one half shell. For example, if the lower half shell is die formed from a cross-shaped stamping with two legs bent downwardly to attach to a base plate and two legs bent upwardly to form the half circle, the tabs or ears may be an integral part of the latter two legs, and extending therebeyond. In this instance there would of course be no cleft at the bottom of the one piece lower half shell. They project circumferentially, and not radially, beyond the upper ends of the lower half shell. The outer surface of the ears has a curvature substantially equal to the inner surface of the half shells so as to fit closely therewith. In order to align the ears 70 and 72 when they are being welded to the lower half of the shell, and to help align the rubber cushion when it is inserted, a pair of tabs 81 are die-cut and bent radially inwardly from the central portion of the shell as shown in FIGS. 2 and 3.

The upper ends of the ears have at least one tapped opening each, 74 and 76 respectively, which match a pair of openings 78 and 80 respectively on the lower ends of upper half shell 32. These openings receive a pair of threaded studs or bolts 84. When inserted, the heads of these bolts are preferably and usually radially recessed within the outer surface of the convex portions 54 of the shell as shown in FIG. 1. Instead of just one bolt between upper half shell 32 and each ear, it may be desirable in some instances to use two bolts 84 and 84' as illustrated in FIG. 2.

Since any shearing stresses caused by shaft play will be on the bolts 84, it may be desirable to provide any shear strength to the assembly by bending the tips 75 of the ears 70 and 72 radially outwardly as illustrated in FIG. 3, to interfit in corresponding slots 77 in the upper shell half. Then any tendency of the upper half or cap to "lift off" will be restrained not only by the bolts 84 but also by these tips. Normally, however, this is not necessary since the tough bolts withstand the small forces imparted thereto.

The assembly of the apparatus is relatively simple. For example, when an automobile mechanic is confronted with the situation where the drive shaft support no longer properly supports the drive shaft, allowing the shaft to oscillate considerably and perhaps makes considerable noise, he disconnects the conventional yokes of the universal joint from each other, and unscrews the cap screws between the conventional one piece shell construction and the frame of the automobile. If the screws twist off, as is often the case, he does not concern himself with removing the rusted, jammed ends from the base of the old collar. Rather, he just removes the shaft and support from the tunnel, hacksaws the old shell into two parts, bends it apart to remove it from the shaft, and throws it away. Then he removes the old, brittle, sagging rubber cushion, for example, by cutting it apart.

To install the new shell and cushion, the latter is first put on the shaft by stretching it to fit over the universal joint yoke 90. Even though the yoke has a diameter as large as the outer diameter of the annular cushion, it has been found that the cushion can be readily stretched to fit over the yoke. It is then fitted around the old bearing 20 by stretching it until the bearing fits in retention pocket 60 of the cushion. Next, lower half shell 30 of the novel structure is pushed up on the new rubber bushing or cushion 18 so that the lower half of the cushion is fitted down between ears 70 and 72 and into position in the concave grooves formed by ridges 54. Then the upper half shell 32 is lowered down atop the ears 70 and 72 and into its interfitting engagement with the projecting ribs 58 of the rubber cushion. If ears 70 and 72 are bent at 75, these tips 75 are snapped into the slots 77. Openings 78 and 80 are aligned with threaded openings 74 and 76 in the ears, and bolts 82 and 84 are then inserted to complete the assembly.

This assembly of support and shaft is inserted axially into tunnel 15. New cap screws 46 are inserted up through the frame 12 to anchor the assembly. The entire operation is relatively simple and easy to perform as contrasted to the almost impossible task heretofore presented. The bolt heads fit easily inside the tunnel since they do not normally project radially outwardly even as far as the outer edge of ridges 54. If the rubber insert 18 becomes saggy at any time due to the weight of the drive shaft 22 tending to cause the rubber to sag on the bottom, especially into the cleft 34, then the unit can be disassembled for insertion of a new rubber grommet. The assembly is sturdy and completely effective for the purpose intended. The ears do not detract from the normal functional qualities of the structure.

Figure 5:
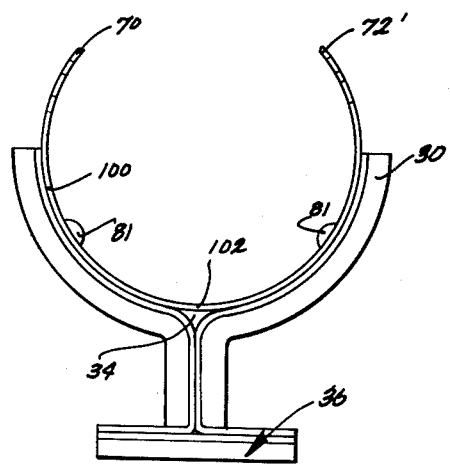
FIG. 5 is an elevational view of the bottom half shell of a slightly modified form of the invention having a special saddle.
Figure 6:
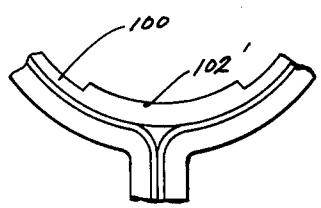
FIG. 6 is a fragmentary, elevational view of the collar with a slightly modified form of saddle.

In fact, in one form of the invention, the novel connection structure adds considerably to the normal functional life of the support. It has been determined that the cleft 34 at the base of the structure tends to accelerate cushion sag since the weight of shaft 22 presses the rubber into the cleft, to shorten the life of the resilient cushion. In the form of the invention illustrated in FIG. 5, a single, continuous, arcuate, steel strap or band 100 having a total span of about 270°, is rigidly secured into the bottom half shell 30 by weldment or the like. Its ends protrude from the lower half shell to form the arcuate ears 70' and 72' for the novel connecting means. Its central portion rests on the flat 55 between pockets 54 and provides a saddle 102 to cover cleft 34, and thereby render added support to the cushion and shaft where the two halves of the lower half shell meet and project radially outwardly to form base 36. Thus, the band performs a novel dual function of (1) allowing quick, simple disassembly and repair and (2) extending the cushion life considerably by substantially reducing or even preventing sagging. Saddle portion 102' of strap 100 may even be slightly elevated as illustrated in FIG. 6 to actually slightly deform resilient cushion 18 radially inwardly to even further assure against sagging.

It will be obvious to those skilled in this art that certain modifications of the illustrative structures depicted, within the principles of this invention, may be made to suit a particular type of vehicle or type of shaft, even on machines or the like. These obvious modifications are deemed to be part of this invention, which is to be limited only by the scope of the appended claims, and the reasonably equivalent structures to those defined therein.

I claim:
1. A vehicle drive shaft support comprising: a rigid annular support shell having mounting base means projecting from one side and adapted to be connected to a vehicle frame inside a vehicle frame tunnel; a resilient cushion means in said shell adapted to support a shaft bearing therein; said shell formed of two generally semi-circular portions separable from each other and from said cushion means; connecting means between said shell portions comprising a pair of inner arcuate ears projecting circumferentially on opposite sides of said shell and each overlapping both of said shell portions over the severance lines therebetween; said ears having a curvature substantially the same as said shell to fit closely thereagainst; and each of said ears being secured to both of said shell portions, with at least one securement on each ear being a releasable connection.

2. A shaft support comprising: a rigid annular support shell having mounting base means projecting from one side; a cushion means in said shell adapted to support a shaft bearing therein; said shell formed of two generally semi-circular portions separable from each other and from said cushion means; connecting means between said shell portions comprising a pair of arcuate ears projecting circumferentially on opposite sides of said shell, and each overlapping both of said shell portions over the severance lines therebetween; said ears having a curvature substantially the same as said shell to fit closely thereagainst; and fastening means between each of said ears to both of said shell portions; with at least one fastening means on each ear being a releasable connection.

3. A compact support shell for a shaft, comprising, a pair of separable semi-circular shell halves; a mounting base on the periphery of one of said halves; one of said shells having a pair of arcuate ears projecting circumferentially therefrom; the outer surface of said ears having a radius of curvature substantially equal to the radius of curvature of the inner surface of the second half shell; and releasable securing means between each end of said second shell and the projecting end of the respective ears to provide a releasable, compact connection therebetween by placement of said second shell over said ears and fastening said securing means.

4. The shell of claim 3 wherein said releasable securing means includes threaded bolts projecting through said second half shell and engaged with tapped orifices in said ears.

5. The shell in claim 4 wherein said securing means also includes integral portions of said ears projecting radially outwardly through openings in said second half shell.

6. A support shell for a vehicle drive shaft adapted to retain a resilient annular cushion and bearing, comprising: a pair of semi-circular shell halves; one of said halves having two arcuate portions with radially outwardly projecting ends having a cleft therebetween and forming a mounting base for attachment of said shell on top of a frame portion of said vehicle, with the weight of said drive shaft on said bearing tending to press said cushion into the cleft formed between the radially projecting ends of said arcuate portions; an arcuate saddle support strap extending across said cleft and circumferentially up around the inside of said one half shell; the ends of said strap extending beyond the ends of said one half shell in an arcuate manner with the same curvature as the central part of the strap to enable the other half shell to be slid thereover; and removable connecting means between the extended ends of said strap and the ends of said other half shell to allow simple attachment and detachment of said shell to said drive shaft cushion and bearing, while simultaneously providing optimum shaft support over said cleft.

7. A support shell for a vehicle drive shaft adapted to retain a resilient annular cushion and bearing, comprising: a pair of semi-circular shell halves; one of said halves having two arcuate portions with radially outwardly projecting ends having a cleft therebetween and forming a mounting base for attachment of said shell on top of a frame portion of said vehicle, with the weight of said drive shaft on said bearing tending to press said cushion into the cleft formed between the radially departing ends of said arcuate portions; an arcuate saddle support strap extending across said cleft and circumferentially up around the inside of said one half shell; the central portion of said strap having an elevated, radially inwardly projecting concave saddle area to provide non-sagging support to said drive shaft and cushion; the ends of said strap extending beyond the ends of said one half shell in an arcuate manner with the same curvature as the central part of the strap to enable the other half shell to be slid thereover; and removable bolt connecting means between the extended ends of said strap and the ends of said other half shell to allow simple attachment and detachment of said shell to a drive shaft, and provide optimum shaft support.

8. A vehicle drive shaft support comprising: a rigid annular support shell having mounting base means projecting from one side and adapted to be connected to a vehicle frame inside a vehicle frame tunnel; a resilient cushion means in said shell adapted to support a shaft bearing therein; said shell formed of two generally semi-circular portions separable from each other and from said cushion means; circumferentially-extending connecting means between said shell portions comprising arcuately curved strap means extending across the junctures of said shells, and having the same curvature of said shells in uniform contact with the peripheries thereof, and including fastening means to releasably secure said half shells together without assuming significant space from the periphery of said shells, whereby said support shell can be readily removed from the drive shaft, and replaced in the frame tunnel having only slight clearance.

References Cited in the file of this patent
UNITED STATES PATENTS

| 1,873,191 | Fabrey | Aug. 23, 1932 |
| 2,547,813 | Coons et al. | Apr. 3, 1951 |
| 2,933,354 | Primeau | Apr. 19, 1960 |